July 12, 1938.  A. L. WARNER  2,123,757
PITMAN PIN BEARING
Filed June 22, 1936
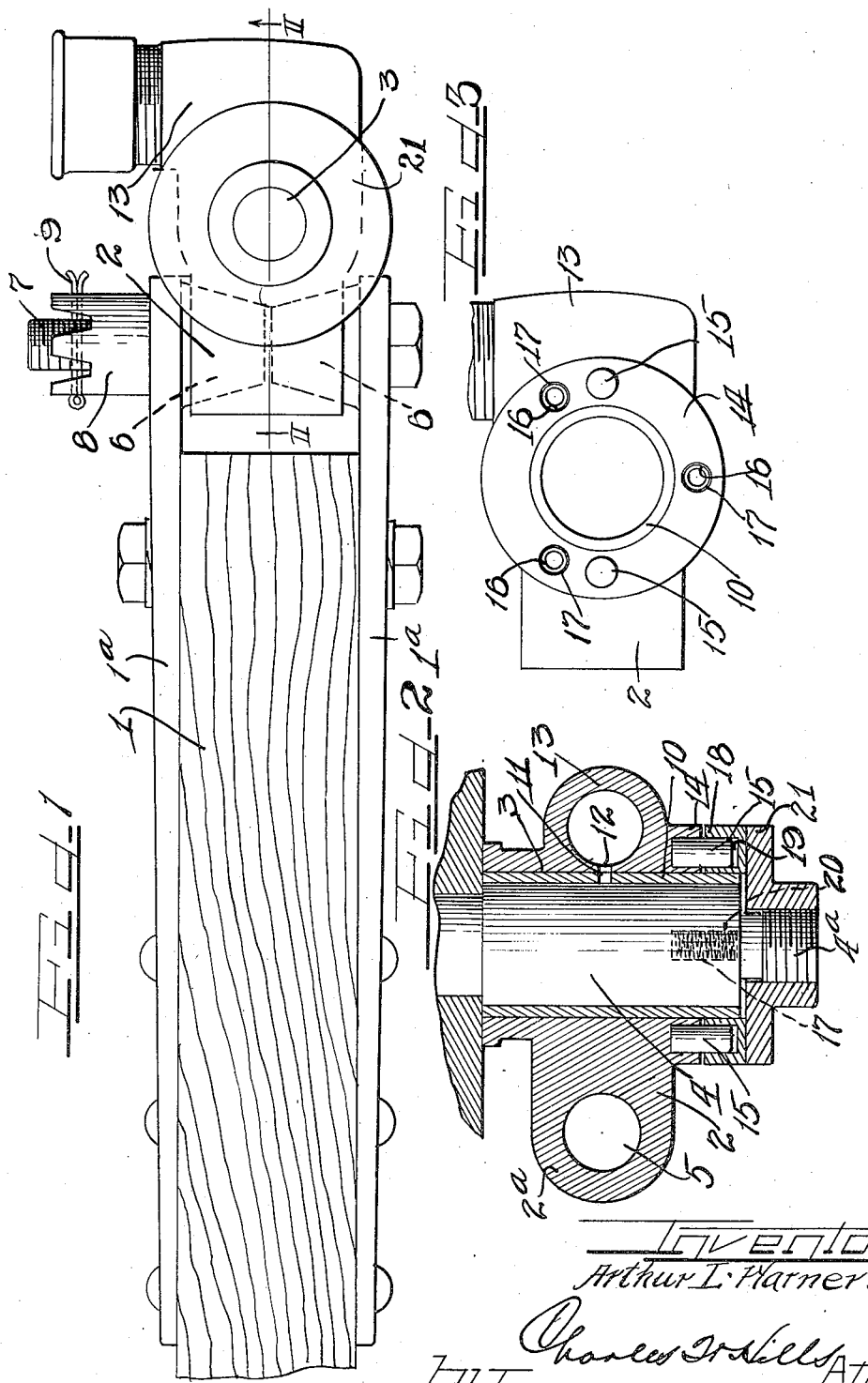

Patented July 12, 1938

2,123,757

UNITED STATES PATENT OFFICE 2,123,757

PITMAN PIN BEARING

Arthur L. Warner, Elgin, Ill., assignor to Illinois Iron & Bolt Company, Carpentersville, Ill., a corporation of Illinois Application June 22, 1936, Serial No. 86,442

6 Claims. (Cl. 308—67)

This invention relates to a pitman pin bearing and concerns itself with a novel structure that automatically compensates for wear and maintains the parts in proper working relation without rattling and looseness.

In the operation of mowers and reapers or the like in which cutting knives are rapidly reciprocated by a pitman, the crank pin that operates the pitman has a comparatively short throw. The pitman however has a rather rapid motion and a great deal of strain is placed upon the pin with the result that the connecting parts soon wear, become loose and rattle.

It is an object of this invention to overcome the above noted objection in the provision of means that automatically takes up the wear of the parts, maintains a proper working relation of the parts and prevents undue and objectionable and destructive rattling of the parts.

The invention comprises the novel structure and combination of parts hereinafter described and more particularly pointed out and defined in the appended claims.

In the accompanying drawing which illustrates a preferred form of this invention and in which similar reference numerals refer to similar features in the different views:

Figure 1 is a fragmentary plan view of a pitman and its operative connection involving this invention.

Figure 2 is a sectional view taken substantially upon the line II—II of Figure 1.

Figure 3 is an end elevational view of Figure 2 with a part removed.

As illustrative of this invention there is shown a pitman or reciprocating member 1 connected to a connection 2 having an aperture 3 for receiving the operating crank pin 4 that drives the pitman.

The driving connection comprises an offset bearing 2a having an aperture 5 that preferably tapers inwardly from the opposite ends for receiving the cone bearings 6 on the arms 1a of the pitman 1. A bolt 7 extends through the cone bearings and is secured in position by a nut 8 and cotter pin 9.

Within the aperture 3, there is a brass bushing 10 having an oil inlet port 11 that communicates with an oil port 12 in a lubricant cup 13 formed integral with the connection upon the opposite side from the bearing 2a. The operating crank pin 4 which is only shown in Figure 2 extends through this bushing.

The outer end of the connection 2 embodies a collar 14 that surrounds the bushing 10 and that may be cast with the connection or later applied. The collar 14 is provided with a pair of diametrically opposite and outwardly extending dowel pins 15 and a plurality of circular recesses 16 that form depressed seats for coil springs 17.

A bearing collar 18 which is provided with apertures or recesses 19 corresponding to the size of the pins 15 and similarly arranged, and with depressed spring seats 20 corresponding to the spring seats 16 is superposed upon the springs 17 and pins 15 so that the springs and pins will lodge in the apertures therein.

The crank pin 4 has a reduced threaded extension 4a that extends beyond the connection 2 and to which a collar 21 is threaded that bears against the outer surface of the collar 18.

The pins 15 prevent the collar 18 from rotating so that the springs 17 will not become twisted but will remain in parallel relation and will be effective for forcing the bearing collar 18 against the bearing nut 21 to take up wear and maintain the parts in proper bearing relation and preventing the parts from working loose or rattling.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. A pitman connection having a bearing lug for the pitman, and having a cylindrical bearing adapted for receiving a driving member, the end of said bearing having a plurality of pegs projecting outwardly therefrom, an end bearing ring having recesses for receiving said pegs, yielding means between said end bearing ring and said connection and a nut adapted for threaded relation with said driving member and bearing against said ring.

2. A pitman connection having a hollow cylindrical bearing and an offset bearing lug adapted for connection to a pitman, a bearing ring concentric with said hollow bearing and positioned adjacent one end thereof, means between said ring and bearing for maintaining said ring against relative rotation, yielding means between said ring and bearing and an abutment adapted for bearing against said ring.

3. In a device of the class described, a driving member, a bearing journaled upon said driving member, an abutment upon the end of said driving member, a bearing collar between the outer end of said bearing and said abutment, said collar and bearing having alined sockets, pegs in said sockets for preventing relative rotation between said bearing and collar, and a series of spaced yielding means between said collar and bearing for urging said collar against said abutment.

4. The combination with a driving member, of a bearing journaled upon said driving member, an abutment upon the outer end of said driving member, a bearing collar between the end of said bearing and said abutment, means for slidably anchoring said collar to said bearing to prevent relative rotation therebetween, and a series of coil springs between said bearing and bearing collar for urging the latter against said abutment.

5. A pitman connection comprising a bearing adapted for receiving a driving member, a bearing collar coaxial with said bearing, said collar and bearing having confronting alined sockets, pins in said sockets for supporting said collar for slidable movements, but preventing relative rotation with respect to said bearing, and a series of coil springs between said bearing and collar for the purpose set forth.

6. In a device of the class described, a reciprocating member, a bearing pivotally connected to said member and having a bearing aperture, a driving member journaled in said aperture, an abutment upon the end of said driving member, a bearing collar between the end of said bearing and said abutment, means for slidably anchoring said collar to said bearing against relative rotation with respect thereto, and a series of yielding elements between said collar and bearing.

ARTHUR L. WARNER.